May 31, 1949.  H. A. STAMPER  2,471,843
REMOTE CONTROL SYSTEM
Filed Nov. 28, 1945  2 Sheets-Sheet 1

INVENTOR.
H. A. STAMPER.
BY
ATTORNEY

May 31, 1949. H. A. STAMPER 2,471,843
REMOTE CONTROL SYSTEM
Filed Nov. 28, 1945 2 Sheets—Sheet 2

INVENTOR.
H. A. STAMPER
BY EWoodbury
ATTORNEY

Patented May 31, 1949

2,471,843

UNITED STATES PATENT OFFICE 2,471,843

REMOTE-CONTROL SYSTEM

Hamilton A. Stamper, Los Angeles, Calif., assignor to Bendix Aviation Corporation, South Bend, Ind., a corporation of Delaware Application November 28, 1945, Serial No. 631,403

9 Claims. (Cl. 318—33)

This invention relates to remote control systems for positioning a movable element at a controlled station in any one of a large number of positions in response to movement of a remote control member.

More specifically, the invention relates to that type of remote control system in which the controlled member has finite increments of movement as distinguished from remote control systems of the Selsyn motor type in which the controlled member has infinitely small increments of movement. However, although in the present system the controlled member is capable of movement only by finite increments corresponding to pre-determined finite increments of movement of the controlling member, the increments of movement can be made exceedingly small, so that for many purposes the following movement of the controlled member becomes practically continuous.

An object of the invention is to provide an electrical remote control system requiring only a relatively small number of connecting lines or communication channels between the controlling and the controlled stations for producing movement of the controlled member into any one of a very large number of finite positions.

Another object is to provide a remote control system employing ten selection channels for positively selecting any one of a plurality of positions, the total number of which may be a multiple of ten, such as 100, 1,000, 10,000 etc.

Another object is to provide a remote control system having a large but finite number of positions selectable by decimal selection in which the controlled member is moved initially at high speed and thereafter at progressively reduced speeds whereby movement into a new position is effected rapidly and accurately.

Another object is to provide a remote control system for moving a controlled member into any one of a large number of positions, in which the direction of movement is automatically controlled to cause the controlled member to move into a new position by the most direct path and automatically correct for overtravel.

Another object is to provide, in a remote control system, for rapid minute readjustment of the controlled member into a new position.

Another object is to provide a remote control system for operating a controlled member into any one of a plurality of positions represented by a multi-digit number in which the position is selected by dialing or otherwise setting up the number at the control station.

Numerous more specific objects and features of the invention will become apparent from the description to follow of a typical embodiment of the invention.

Broadly, the system in accordance with the invention comprises a control station and a controlled station interconnected by ten separate lines or communication channels over which the selecting impulses or currents are applied, for controlling the rotation of a motor driven shaft at the controlled station into any one of a plurality of positions corresponding to a multi-digit number.

A full understanding of the invention may be had from the following detailed description of a particular embodiment thereof, with reference to the drawing, in which.

Figure 1:
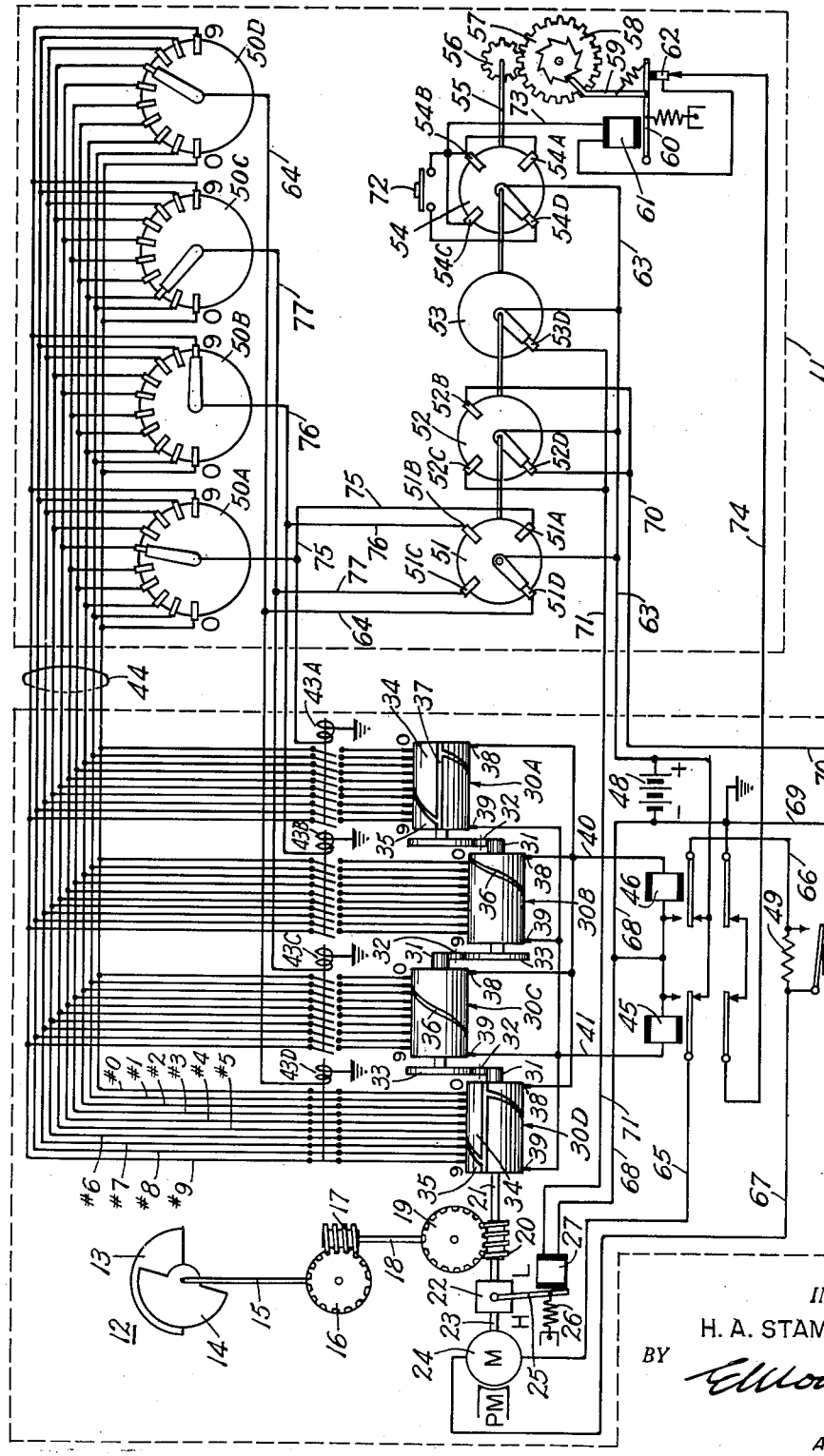
Fig. 1 is a schematic diagram of the system.

Referring to Fig. 1, the apparatus at the controlled station is enclosed in the broken line 10 and the apparatus at the control station is shown enclosed in the broken line 11. These two stations may be separated any desired distance.

The system as disclosed is used for the remote control of a variable tuning condenser 12, which condenser has a stationary stator element 13, and a rotor element 14 which is adapted to be rotated through 180° to vary the capacity of the condenser. To this end, the rotor 14 is shown coupled by a shaft 15 to a worm gear 16 which is driven by a worm 17 on a shaft 18, the latter being, in turn, driven by a worm wheel 19 which meshes with a worm 20 on a shaft 21. Shaft 21 is driven through a two speed transmission 22 by a shaft 23 of an electric motor 24. The transmission 22 has a control lever 25, movable between a high position H and a low position L, and is normally maintained in position H by a spring 26, but is adapted to be moved into low speed position by a magnet 27. The motor 24 is shown as being of the permanent magnet type which reverses its direction of rotation in response to reversal of the current applied to the armature, and which is dynamically braked when the armature is short circuited.

In the particular system disclosed, the shaft 21 is adapted to be rotated through 1,000 revolutions in increments of one tenth of a revolution, so that it can be moved into and stopped at any one of 10,000 positions. Since the total possible movement of shaft 21 is 1,000 revolutions, and the condenser rotor 14 is to be moved through a total movement of only one-half revolution, the worm wheels 16 and 19 and the worms 17 and 20 are so proportioned as to provide a speed reduction ratio of 2,000 between the shaft 21 and the shaft 15.

Any desired speed reduction may be obtained between the shaft 23 and the shaft 21 by means of the transmission 22, but for convenience it may be assumed that when adjusted for high speed the transmission 22 provides direct drive between the shaft 23 and the shaft 21, and when adjusted into low speed position it provides a speed reduction of 100 to one between shafts 23 and 21.

The stopping of the motor 24 is under the control of four selector drums 30A, 30B, 30C and 30D, all of which are identical and are rotated at different speeds in synchronism with the movement of shaft 21. Thus, drum 30D is directly connected to and rotates with shaft 21; drum 30C is coupled by a pinion 31 on drum 30D, an idler pinion 32 and a gear 33 to rotate at one-tenth the speed of drum 30D; drum 30B is similarly coupled to drum 30C to rotate at one-tenth the speed thereof; and drum 30A is similarly coupled to drum 30B to rotate at one-tenth the speed thereof. To avoid confusion in following the operation of the system, the idler gears or pinions 32 have been provided to cause all of the drums 30 to rotate in the same direction. However it is to be understood that in practice it is not necessary to rotate the drums in the same direction and a simpler mechanism can be employed to intercouple them.

Each of the drums 30 comprises two segments 34 and 35 of electrically conducting material separated by a helical strip 36 of insulating material and by a longitudinal strip 37 of insulating material (see drum 30A). The segment 34 of each drum always contacts and makes electrical connection to a brush 38 associated therewith and the segment 35 of each drum is always connected to a brush 39. All of the brushes 38 associated with the four drums are connected together and to a common conductor 40, and all of the brushes 39 are connected together and to a common conductor 41.

There are also associated with each of the drums 30 a set of ten selection brushes numbered 0–9 from right to left respectively. The ten brushes of each set are arranged in a longitudinal row so that they are successively contacted by the helical insulating strip 36 as the drum rotates through successive increments of one-tenth revolution.

The ten selection brushes of drum 30A are adapted to be connected by a relay 43A to ten control lines, collectively designated by the numeral 44, which extend between the controlled station and the control station; likewise, the ten selection brushes of drum 30B are adapted to be connected to the lines 44 by a relay 43B; the selection brushes of drum 30C are adapted to be connected to the lines 44 by a relay 43C; and the selection brushes of drum 30D are adapted to be connected to the lines 44 by a relay 43D.

The apparatus at the controlled station 10 also includes a pair of control relays 45 and 46, a speed control relay 47 and a current source 48. When the relay 45 is energized, it closes contacts to complete a circuit to the motor 24 from the source 48 to cause the motor to run in one direction, and when the relay 46 is energized it applies current from the source 48 to the motor 24 of opposite polarity to cause the motor to run in the other direction. When both relays 45 and 46 are de-energized, the motor 24 is short circuited, so that it is dynamically braked. When the relay 47 is energized it cuts a resistor 49 into the motor circuit to reduce its speed to approximately one-fourth of normal speed.

The apparatus at the control station 11 includes four selection switches 50A, 50B, 50C and 50D, the positions of which determine the position into which the condenser rotor 14 at the controlled station will be moved. In addition to the selection switches 50, the control station includes a plurality of switches 51, 52, 53 and 54, all actuated by a common shaft 55 which is adapted to be rotated into any one of four positions. To this end, the shaft 55 is shown connected to a pinion 56 which meshes with a gear 57 attached to a ratchet wheel 58 which is stepped around by a pawl 59 connected to the armature 60 of a stepping relay 61.

The system operates as follows:

Following the completion of each operation, the shaft 55 is in the position shown in the drawing, in which the movable contacts of the switches 51, 52, 53 and 54 are left closed on contacts 51D, 52D, 53D, and 54D respectively. The movable contacts of all four of these switches are connected by a conductor 63 to the positive terminal of the source 48 at the controlled station. Positive potential is therefore applied over conductor 63 and contact 51D to a conductor 64 which is connected to the movable contact of the selection switch 50D and is also connected to the relay 43D. Since the other terminal of the relay 43D is connected to the grounded, negative terminal of the source 48, relay 43D is actuated to connect the control lines 44 to the selection brushes of drum 30D.

Positive potential is applied from the conductor 64 to the movable contact of the selection switch 50D and thence over the #6 control line to the #6 selection brush of drum 30D. However this brush is resting on the helical insulating segment 36 of drum 30D so that the circuit is open at the drum. Since the relays 43A, 43B, and 43C are open, and since the #6 selection brush of drum 30 is on the insulating segment 36, no potential is applied through the selection drums to either the conductor 40 or the conductor 41, and the control relays 45 and 46 are deenergized. Under these conditions, the motor 24 is short circuited over a conductor 65, the front armature and its back contact of relay 45, the front armature and its back contact of relay 46, a conductor 66, the resistor 49 and a conductor 67. Hence, the shaft 21 remains in the position to which it was last moved.

It is sometimes desirable to minutely adjust the position of the condenser rotor 14, and such adjustment can be effected by merely shifting the movable contact of the selection switch 50D at the control station. Thus, assume that the movable contact of switch 50D is shifted from the sixth contact back to the fifth contact, thereby applying positive potential to the #5 control line. This applies positive potential to the #5 selection brush of drum 30D, which is resting on the segment 34 of that drum, so that current flows over conductor 40 through the relay 46 to the negative terminal of the source 48, thereby energizing relay 46. This completes a circuit from the negative terminal of source 48 over the conductor 68 through the front contact and front armature of relay 46, through the conductor 66, the resistor 49, the conductor 67, the motor armature, conductor 65, the front armature of relay 45 and its back contact, to the positive terminal of source 48, causing the motor 24 to run in direction to carry the insulating segment 36 of drum 30D under the #5 selection brush of that drum, whereupon the previously described circuit over which relay 46 was energized is broken to restore the circuit to normal and stop the motor in the new position.

The motor runs slowly during this operation because the resistor 49 was cut into its operating circuit by operation of relay 47. This relay was energized by current flowing from the negative terminal of the source 48 over a conductor 69, through the relay 47, through a conductor 70 to the contact 52D of switch 52, and thence over the movable contact of that switch and over the conductor 63 back to the positive terminal of source 48. Furthermore, the shaft 21 was rotated at slow speed relative to the motor shaft 23, because the transmission 22 was held in low speed position by magnet 27, the latter being energized by current flowing from the negative terminal of source 48 over the conductor 68, through the magnet 27, over a conductor 71 to contact 53D of switch 53, and over the movable contact of that switch and over the conductor 63 back to the positive terminal of the source 48.

By virtue of the reduced speed of the motor 24 due to the introduction of the resistor 49 into its operating circuit and the low speed of shaft 21 produced by the transmission 22, the drum 30D is rotated at a sufficiently slow speed to prevent the drum from over-riding and carrying its segment 35 into contact with the #5 selection brush.

The selection switch 50D can be operated into any position and the system will function in the manner described to cause the shaft 21 to assume a corresponding position in which the insulating segment 36 of the drum 30D is juxtaposed to the selection brush corresponding to the stationary contact of selection switch 50D that is energized. The operation was described for the condition in which the movable contact of selection switch 50D was moved to a lower number. If the selection switch 50D is reset to a higher number, the operation will be the same as described except that the energized selection brush of drum 30D will then complete a circuit over the drum segment 35 to the conductor 41, and energize the relay 45 instead of the relay 46. When the control relay 45 is energized, the negative terminal of the source 48 is connected to the conductor 65 and the positive terminal of the source is connected to the conductor 67 instead of vice-versa, causing the motor 24 to run in the opposite direction. In other words, the control relays 45 and 46 determine the direction in which the motor 24 runs; when the relay 45 is energized the motor runs in a direction to move the insulating segments 36 of the selection drums toward higher numbered selection brushes, whereas, when relay 46 is energized the motor runs in the opposite direction to move the insulating segments 36 of the drums toward lower numbered selection brushes.

It will be observed that the limit of motion of the shaft 21 that can be effected by actuation of the selection switch 50D alone is one revolution. If greater movement is to be produced, one or more of the remaining selection switches 50A, 50B and 50C must be reset and a starting switch 72 actuated.

As shown, the system is in a position corresponding to the number 5926 which is set up on the four selection switches 50A, 50B, 50C and 50D. Let it be assumed that the condenser rotor 14 is to be moved into a new position corresponding to the number 3508. The operator first sets this new number into the selection switches by setting the movable member of switch 50A on the #3 contact, setting the movable contact of switch 50B on the #5 contact, setting the movable contact of switch 50C on the #0 contact, and setting the movable contact of switch 50D on the #8 contact; after which he presses the starting switch 72.

The resetting of the selection switches 50A, 50B, and 50C has no immediate effect on the system, because the relays 43A, 43B and 43C at the controlled station are open. However, when the switch 50D is reset, the #8 control line is energized in the manner previously described to cause the motor to run until the insulating segment 36 of the drum 30D is under the #8 selection brush.

Thereafter, the closure of the starting switch 72 completes a circuit from the positive terminal of source 48 over the conductor 63 and the movable contact of switch 54 to the stationary contact 54D thereof, thence through the starting switch 72 and over a conductor 73 through the stepping relay 61, over back contacts 62 of the relay, and over a conductor 74 and through the back armatures and their back contacts of relays 45 and 46 to the negative terminal of the source 48. The stepping relay 61 is thereupon actuated to rotate the shaft 55 through one-quarter of a revolution to carry the movable contacts of the switches 51, 52, 53 and 54 into their "A" positions.

Movement of the switch 54 into the "A" position completes a circuit from the conductor 63 to the stepping relay 61 through the contact 54A independent of the starting switch 72, so that during the rest of the cycle the stepping relay is under the control of the relays 45 and 46 at the controlled station.

Following the described movement of the switches 51, 52, 53 and 54 through one-quarter of a revolution by the stepping relay 61, the movable contact of the switch 51 applies positive potential from the conductor 63 to the contact 51A, and thence over a conductor 75 to the movable contact of the selection switch 50A and to the relay 43A. Since switch 43D was deenergized, and relay 43A was energized, by the movement of the movable contact of switch 51 from contact 51D to contact 51A, only the selection brushes of drum 30A are now connected to the control lines 44. Likewise, only the movable contact of the selection switch 50A is now connected to the positive terminal of the source 48.

Current now flows from the positive terminal of the source 48 over conductor 63 and through switch 51 and conductor 75, and through selection switch 50A to the #3 contact thereof and thence, over the #3 control line to the #3 selection brush of drum 30A, and thence over the segment 34 of this drum, and the conductor 40, through the relay 46 to the negative terminal of the source, energizing relay 46.

The energization of relay 46 energizes the motor 24 from the source 48 over the conductor 68, the front contact and front armature of relay 46, the conductor 66, the back contact and armature of relay 47, the conductor 67, the conductor 65 and the front armature and back contact thereof of relay 45, back to the positive terminal of the source 48, causing the motor 24 to run in such direction as to carry the insulating segment 36 of drum 30A toward the #3 selection brush of that drum. The motor operates at high speed because the resistor 49 is short circuited by the relay 47 which is de-energized because its energizing circuit is open at contacts 52D, and 52B of switch 52. Furthermore, the shaft 21 is operated at full speed because the energizing circuit of the magnet 27 is open at contact 52C of switch 52, so that the transmission 22 is conditioned for direct drive between shafts 23 and 21. Maximum speed of the shaft 21 is desirable during selection by the drum 30A, because it runs at only 1,000th the speed of the shaft 21.

The energization of the control relay 46 interrupted the energizing circuit of the stepping relay 61 at the back contact of the back armature of relay 46, so that the stepping relay, remained de-energized after dropping its armature 60 back to engage the next tooth of the ratchet wheel 58.

When the rotation of the drum 30A has carried the insulating segment 36 under the #3 selection brush, the energizing circuit for the relay 46 is interrupted and the armatures of the relay fall back. The front armature disconnects the source 48 from, and short circuits, the armature of motor 24, causing it to stop.

The closure of the back armature of relay 46 on its back contact restores the energizing circuit of the stepping relay 61, which again pulses, to shift the switches 51, 52, 53 and 54 one-quarter revolution into their "B" positions. This causes switch 51 to disconnect the positive conductor 63 from the contact 51A, thereby taking potential off the movable contact of the selection switch 50A, and connect conductor 63 to the switch contact 51B, which is connected by a conductor 76 to the movable contact of the selection switch 50B and to the relay 43B, making selection switch 50B and the drum 30B active. Current thereupon flows from the positive terminal of the battery over the conductor 63 and through the switch 51 and the conductor 76, through the movable contact and the #5 stationary contact of the selection switch 50B, and over the #5 control line to the #5 selection brush of drum 30B.

From the #5 selection brush of drum 30B, the current flows through the segment 35 of that drum through the conductor 41, the control relay 45 and conductor 68 back to the negative terminal of the source 48, energizing relay 45, which in turn energizes the motor 24 over its front armature, as previously described, to run the motor in such direction as to carry the insulating segment 36 of drum 30B under the #5 selection brush, which releases the control relay 45 to stop the motor.

Since the drum 30B rotates ten times as fast as the drum 30A, it is desirable to run the shaft 21 at a slower speed than that at which it ran when drum 30A was active. This reduction in speed is effected by energizing the relay 47 to cut the resistor 49 into the motor circuit, the relay 47 being energized, during selection by the drum 30B over the contact 52B of switch 52. However, since the speed reduction during selection by drum 30B need not be as great as that required during selection by the faster moving drums 30C and 30D, the transmission 22 remains in high speed, or direct drive, position by virtue of the fact that the energizing circuit for magnet 27 is open at switches 52 and 53 when the latter switches are in their "B" position.

The de-energization of the control relay 45, at the completion of the selecting movement of the drum 30B, again completes the energizing circuit for the stepping relay 61, causing the latter to pulse and rotate the switches 51, 52, 53, and 54 into their "C" position. This connects the positive conductor 63 to the contact 51C of switch 51, and thence over a conductor 77 to the relay 43C and the movable contact of the selection switch 50C. This renders the selection switch 50C and the drum 30C active, and since the movable contact of switch 50C is now connected to its #0 contact and the #0 control line, a circuit is completed over segment 34 of drum 30C and conductor 40 to the control relay 46, energizing the latter to complete the circuit to the motor 24 and cause it to run in such direction as to move the insulating segment 36 of drum 30C under the #0 selection brush of that drum.

During selection by the drum 30C, the circuit of the relay 47 is open at the switch 52, so that the resistor 49 is short circuited, and the motor runs at full speed. However, the magnet 27 is energized over contact 52C of switch 52 so that the transmission is adjusted into low speed position in which the shaft 21 is rotated at 100th the speed of the motor shaft 23. Hence, the drum 30C rotates, during its selection operation, at substantially the same speed that drum 30A rotated when it was selecting.

At the end of its selecting operation, the drum 30C opens the circuit to the control relay 46, causing the latter to release, which in turn stops the motor 24 and again completes the energizing circuit to the stepping relay 61, causing it to rotate the shaft 55 through another one-quarter revolution and restore the switches 51, 52, 53 and 54 to their "D" position. In this position, the circuit of the stepping relay 61 is open at the starting switch 72, so that it cannot again operate until the starting switch is closed to start a new cycle of operations.

With the switch 51 in its "D" position, the positive conductor 63 is connected to the movable contact of the selection switch 50D and to the relay 43D. Since the selection switch 50D now has its movable contact connected to the #8 stationary contact, positive potential is applied over the #8 control line to the #8 brush of the drum 30D, and the latter drum is moved to center its insulating segment 36 under the #8 brush as previously described. This completes a cycle of operation.

It will be noted that each of the drums 30A, 30B, 30C and 30D runs at a relatively slow speed when it is active. Thus, when the drum 30A is active, the motor 24 runs at full speed and the motor shaft 23 is directly connected to the shaft 21 by the transmission 22. When drum 30B is active, the speed of the shaft 21 is reduced to approximately one-fourth of its normal speed by the introduction of the resistor 49 into the motor circuit. When drum 30C is active, the motor 24 runs at full speed but the transmission is shifted into low speed position in which the motor shaft 23 rotates 100 times as fast as the shaft 21. In the normal position of the system, when the drum 30D is active, the motor speed is reduced to one-fourth its normal speed by introduction of the resistor 49 into the motor circuit, and the transmission 22 is adjusted into low speed position, so that the shaft 21 rotates at only 1/400 of its full speed.

By virtue of the speed changes described, each of the drums 30A, 30B, 30C and 30D runs at a sufficiently slow speed during its selection period that it can be stopped before the insulating segment 36 runs past the energized selection brush. However, since the next adjacent drum to the left runs ten times faster, it cannot stop in a position that can be accurately determined in advance.

Figure 2:
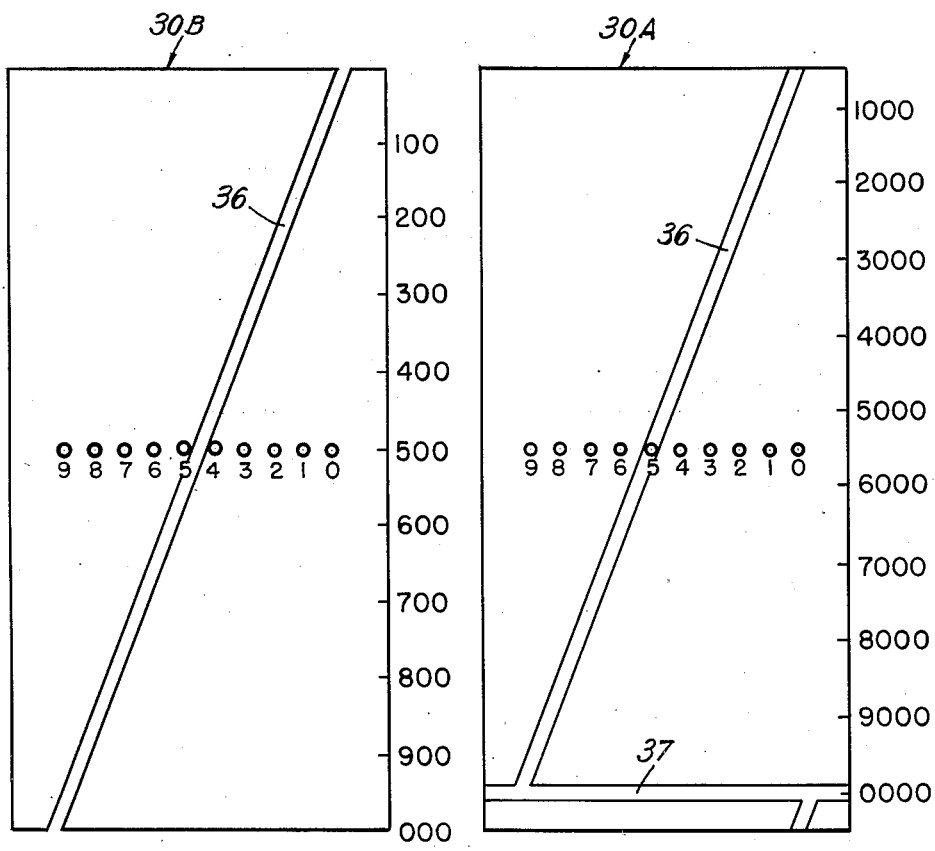
Fig. 2 is a diagram showing a pair of adjacent selection drums, the peripheral surfaces of which are shown developed.

I have therefore found it desirable to so orient the drums 30A, 30B, 30C and 30D with respect to their selection brushes that when any one of the three drums 30A, 30B and 30C has its insulating segment 36 centered under one of its selection brushes, the drum, instead of being in the position of rotation corresponding to the number of the active selection brush, is displaced half way between that number and the next higher number, and the next drum to the left thereof is positioned with its insulating segment 36 under the #5 selection brush. This arrangement can best be understood with reference to the diagram of Fig. 2, which shows the drums 30A and 30B as they would appear with their peripheral surfaces flattened out so as to make the whole peripheries visible. It will be observed that the drum 30A is so positioned that its insulating segment 36 is centered under the #5 selection brush, whereas the drum is actually in a position corresponding to the number 5,500 instead of the position corresponding to the number 5,000. Accordingly, the drum 30B is in a position corresponding to the number 500 instead of being in a position corresponding to number 000. It will be apparent therefore, that when the drum 30A is controlling the selection, it can over-shoot in either direction a substantial distance without carrying the faster moving drum 30B into a position corresponding to a number other than a number lying between 5,000 and 6,000. In other words, during selection by the drum 30A, the faster moving drum 30B can over-shoot nearly half a revolution in either direction and then be moved into its proper position when it becomes active in the next step of the selection cycle.

On the other hand, if the selection brushes were so oriented that when, for example, the #5 selection brush of drum 30A was centered with respect to the insulating segment 36, the drum 30A was in a position corresponding to the number 5,000, then theoretically the drum 30B should be positioned with its #0 brush centered on its insulating segment 36, and if the drums were running in direction corresponding to a movement from a high number to a low number, the drum 30B might, as a result of over-shooting, be stopped with its #9 or its #8 brush on the insulating segment 36. Supposing that the position to be selected by the drums 30A and 30B correspond to the number 5,200, the system would then actually function to stop in the position 4,200.

However, by orienting the selection brushes of drums 30A, 30B, 30C and 30D, as described, the next faster moving drum can over-shoot nearly half a revolution in either direction without causing the setting up of a wrong position.

It will be observed that with the system described, an unlimited number of positions can be selected with the use of only ten control lines 44 between the stations. In the system shown, employing four selection switches at the control station and four selection drums at the controlled station, 10,000 positions can be selected. The total number of positions that can be selected can be represented by the number $10^n$, where "$n$" represents the number of the selection switches and selection drums. In the present instance, the number is represented by $10^4$ which is equal to 10,000.

The system can be made to operate relatively fast and accurately by virtue of the fact that the speed of the driven shaft 21 can be successively reduced by means of the transmission 22 and the resistor 49, to permit relatively high speeds of the shaft 21 during selection by the relatively slowly moving drums, while reducing the speed of the shaft 21, only during selection by the faster moving drums.

Because of the fact that the system is capable of selecting automatically by movement of the drums in either direction and the fact that when one drum is in a selected position the next faster moving drum is substantially in its mid-position, insurance is had against errors due to over-running of the faster moving drums.

Although for the purpose of explaining the invention a specific embodiment thereof has been described in detail, many changes from the elements as schematically shown will be obvious to those skilled in the art and the invention is therefore to be limited only to the extent set forth in the pending claims.

I claim:

1. In a system of the type described having a control station and a controlled station; a plurality of control lines interconnecting said stations; a plurality of selection switches at said control station, each adapted to complete a circuit to different ones of said control lines, according to its setting; a driven member at the controlled station and an electric motor coupled thereto for driving it; a plurality of rotatable selection members at said controlled station, each corresponding to a different one of said selection switches at the control station, and each adapted to be associated with said control lines, and, when so associated, open a different one of said control lines in each of a plurality of predetermined different positions of rotation of the selection member; means coupling said selection members to said driven member and to each other, for rotation at predetermined different speeds; a plurality of control circuits for energizing said motor and means for successively completing different ones of said control circuits, the first control circuit including the slowest selection member and its corresponding selection switch, and succeeding control circuits including successively faster selection members and their corresponding selection switches, whereby said motor is successively energized to successively rotate said selection members into the positions corresponding to the settings of their associated selection switches.

2. A system as described in claim 1 in which said control lines are ten in number, corresponding to the digits 0 to 9 inclusive and successive selection members have a speed ratio of 10 to 1, whereby said driven member has $10^n$ finite selectable positions of rotation, where "$n$" represents the number of selection switches.

3. A system as described in claim 1 including means for varying the speed of said electric motor and means for actuating said speed-varying means to run the motor slower during selection by one of said faster selection members than during selection by a slower selection member.

4. A system as described in claim 1 including multi-speed transmission means coupling said electric motor to said driven member and a means for actuating said transmission means to run said driven member slower, relative to the motor speed, during selection by one of said faster selection members than during selection by a slower selection member.

5. A system as described in claim 1 including means for varying the speed of said electric motor, and a multi-speed transmission having high and low speed positions for coupling said motor to said driven member, means for actuating said speed-varying means to run the motor at high speed and adjusting the transmission to high speed during selection by the slowest selection member; means for actuating said speed-varying means to run the motor slower and for adjusting said transmission to high speed during selection by a second selection member; means for actuating said speed-varying means to run the motor at high speed and for adjusting said transmission to low speed during selection by a third of said selection members; and means for actuating said speed-varying means to run the motor at slow speed and for adjusting said transmission to slow speed during selection by a fourth of said selection members operating at a higher speed than said second and third selection members.

6. A system as described in claim 1 in which said means for successively completing said control circuits includes a sequence switch successively operable into as many different positions as there are selection switches, and means responsive to positioning of a selection member in position corresponding to the setting of its corresponding selection switch for actuating said sequence switch into its next position.

7. A system as described in claim 1 in which said means for successively completing different ones of said control circuits includes a sequence switch; means responsive to positioning of each selection member except the fastest one into position corresponding to the setting of its corresponding selection switch, for actuating said sequence switch into its next position; and starting means for actuating said sequence switch from its final position into its starting position.

8. A system as described in claim 1 in which said driven member and said selection members are reversible and each of said selection members comprises a commutator member having a pair of conductive segments separated by an insulating segment, a plurality of brushes bearing on said commutator and connectable to said respective control lines, each commutator and said brushes being so arranged that in each of a plurality of selectable positions of rotation of said commutator, a different one of said brushes rests on said insulating segment and the other brushes rest on one or the other of said two conducting segments; said control circuits for energizing said motor including a first circuit connected to one of said conductive segments operable to drive said driven member in one direction and a second control circuit connected to the other conductive segment operable to drive said driven member in the other direction, whereby the direction of rotation of said driven member and said commutators is such as to move each commutator, when it is selecting, in direction to carry the insulating segment thereof below the active brush without moving the commutator beyond the limits of its selection range; said commutators being so oriented with respect to each other that when one commutator is in a selected position, the next faster-moving commutator is intermediate the ends of its range of selectable positions.

9. A system as described in claim 1 in which said control lines are ten in number, corresponding to the digits 0 to 9 inclusive, and successive selection members have a speed ratio of 10 to 1, whereby successive selection members select positions corresponding to the values of successive digits of a multi-digit number; in which each selection member is reversible, whereby it can move from any position to another position within the limits of a single revolution; and in which said selection members are so oriented with respect to each other that when one member is in a selected position, the next faster-moving selection member is intermediate the ends of its range of selectable positions.

HAMILTON A. STAMPER.

REFERENCES CITED

The following references are of record in the file of this patent:

UNITED STATES PATENTS

| Number | Name | Date |
| --- | --- | --- |
| 1,096,627 | Hitner | May 12, 1914 |
| 1,911,178 | Buchhold | May 30, 1933 |

FOREIGN PATENTS

| Number | Country | Date |
| --- | --- | --- |
| 17,265 | Great Britain | Dec. 8, 1915 |